United States Patent
Gilgen et al.

(10) Patent No.: US 8,055,806 B2
(45) Date of Patent: Nov. 8, 2011

(54) AUTONOMIC THREADING MODEL SWITCH BASED ON INPUT/OUTPUT REQUEST TYPE

(75) Inventors: David B. Gilgen, Raleigh, NC (US); William D. Wigger, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1479 days.

(21) Appl. No.: 11/465,834

(22) Filed: Aug. 21, 2006

(65) Prior Publication Data

US 2008/0126613 A1    May 29, 2008

(51) Int. Cl.
*G06F 3/00* (2006.01)
(52) U.S. Cl. .................... 710/5; 710/6; 710/7
(58) Field of Classification Search ............ 710/5–7
See application file for complete search history.

(56) References Cited

U.S. PATENT DOCUMENTS

| | | | |
|---|---|---|---|
| 6,161,152 A | 12/2000 | Garg et al. | |
| 6,925,424 B2 | 8/2005 | Jones et al. | |
| 6,988,268 B2 | 1/2006 | Zuberi | |
| 7,181,741 B2 * | 2/2007 | Sangili | 718/1 |
| 2003/0065892 A1 * | 4/2003 | Bonola | 711/147 |
| 2004/0199919 A1 | 10/2004 | Tovinkere | |
| 2005/0050550 A1 | 3/2005 | Fuller | |
| 2005/0086359 A1 | 4/2005 | Banerjee et al. | |
| 2005/0198475 A1 | 9/2005 | Arnold et al. | |
| 2005/0289213 A1 | 12/2005 | Newport et al. | |

* cited by examiner

*Primary Examiner* — Alford Kindred
*Assistant Examiner* — David Martinez
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to threading model switching between asynchronous I/O and synchronous I/O models and provide a novel and non-obvious method, system and computer program product for autonomic threading model switching based upon I/O request types. In one embodiment, a method for autonomic threading model switching based upon I/O request types can be provided. The method can include selectably activating and de-activating a blocking I/O threading model according to a volume of received and completed blocking I/O requests.

13 Claims, 2 Drawing Sheets

AUTONOMIC THREADING MODEL SWITCH BASED ON INPUT/OUTPUT REQUEST TYPE

BACKGROUND OF THE INVENTION

1. Field of the Invention

The present invention relates to the field of input/output (I/O) processing and more particularly to threading models for asynchronous and synchronous I/O.

2. Description of the Related Art

I/O processing refers to the request and receipt of data to and from external devices and logic over I/O ports. Devices coupled to I/O ports can range from communications transceivers to storage devices and the like. I/O ports typically buffer incoming data and pass the incoming data to requesting applications. In this way, applications can access external devices and can incorporate external communications within the application logic itself I/O process models generally come in two forms: synchronous I/O and asynchronous I/O. In synchronous I/O, a requesting application can post a request for data on an I/O port and can discontinue the logical sequence of the application until the requested data is received on the I/O port. As a practical consequence to synchronous I/O, an application can "hang" while awaiting a response to an I/O request. In contrast to synchronous I/O, in asynchronous I/O, a requesting application can post a request for data on an I/O port and can continue the logical sequence of the application without waiting for a response. Upon receipt of the requested data on the I/O port, the application can retrieve the requested data.

Synchronous I/O often is referred to as "blocking I/O" in that the requesting process remains blocked from continuing execution until a response to the I/O request is received. By comparison, asynchronous I/O often is referred to "non-blocking I/O" in that the requesting process is free to continue processing while awaiting a response to the I/O request. Generally, computing systems either completely support the synchronous I/O model, or the asynchronous I/O model--but not both. For systems that support the asynchronous I/O model, support for the synchronous I/O model must be simulated.

Specifically, since most asynchronous I/O models do not completely support blocking I/O, support for blocking I/O must be simulated by forcing an application thread that requests blocking I/O into a wait. Thereafter, another thread hosting logic enabled to wait on completion events, can wait on the requested I/O until the request is satisfied. Thereafter, the waiter thread can pass the result to the application thread and the application thread can continue execution.

Generally, one of two approaches is taken when working with an asynchronous I/O model. In the former approach, all events are handled by a dedicated thread or threads that either notify a waiting worker thread if the event is for a synchronous I/O request, or that pass the event to a worker thread—generally from a thread pool—to process the event if the event is for an asynchronous I/O request. In the latter approach, events are handled directly on the worker threads as they are received, either notifying a waiting thread, or processing the event.

Both approaches for simulating support for synchronous, blocking I/O in an asynchronous, non-blocking I/O model suffer well-documented deficiencies. In the former approach, when the majority of I/O requests are in the form of non-blocking, asynchronous I/O requests, substantial overhead can be consumed in thread/context switching for every I/O completion event. In the latter approach, when the majority of I/O requests are in the form of blocking, synchronous I/O requests, the worker threads can become quickly overwhelmed making blocking requests, leaving no worker threads to query for events to wake up waiting threads.

BRIEF SUMMARY OF THE INVENTION

Embodiments of the present invention address deficiencies of the art in respect to threading model switching between asynchronous I/O and synchronous I/O models and provide a novel and non-obvious method, system and computer program product for autonomic threading model switching based upon I/O request types. In one embodiment, a method for autonomic threading model switching based upon I/O request types can be provided. The method can include selectably activating and de-activating a blocking I/O threading model according to a volume of received and completed blocking I/O requests.

In particular, the method can include establishing a threshold value above which a blocking I/O threading model is to be activated, incrementing a counter for each received blocking I/O request, and responsive to the counter exceeding the threshold value, the blocking I/O threading model can be activated. Similarly, the method can include decrementing the counter for each completed blocking I/O request, and, responsive to the counter falling below the threshold value, the blocking I/O threading model can be de-activated. In one aspect of the embodiment, activating the blocking I/O threading model can include spawning a dedicated thread to process completed blocking I/O requests while deferring completed non-blocking I/O requests to associated worker threads. Conversely, de-activating the blocking I/O threading model can include destroying the dedicated thread.

Another embodiment of the invention can include a data processing system configured for autonomic threading model switching based upon I/O request types. The system can include a blocking I/O request threading model, a non-blocking I/O request threading model, and autonomic model switching logic. The autonomic model switching logic can include program code enabled to selectably activate and de-activate the blocking I/O request threading model according to a volume of received and completed blocking I/O requests in the system. In one aspect of the embodiment, the system further can include a counter configured to be incremented responsive to a receipt of a blocking I/O request in the system, and to be decremented responsive to a completion of a blocking I/O request in the system. In another aspect of the embodiment, the blocking I/O request threading model can include program code enabled to spawn a dedicated thread to processing blocking I/O requests.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for autonomic threading model switching based upon I/O request types. In accordance with an embodiment of the present invention, a blocking I/O threading model can be selectably activated and de-activated according to a volume of blocking I/O requests received and completed in a computing system. For instance, a counter can be maintained to track a number of received and yet to be completed blocking I/O requests. When the counter exceeds a pre-determined threshold, a dedicated thread can be created to process blocking I/O requests in accordance with a blocking I/O threading model. Conversely, when the counter falls below a pre-determined threshold, the dedicated thread can be destroyed and subsequently received blocking I/O requests can be processed in accordance with a non-blocking I/O threading model.

Figure 1:
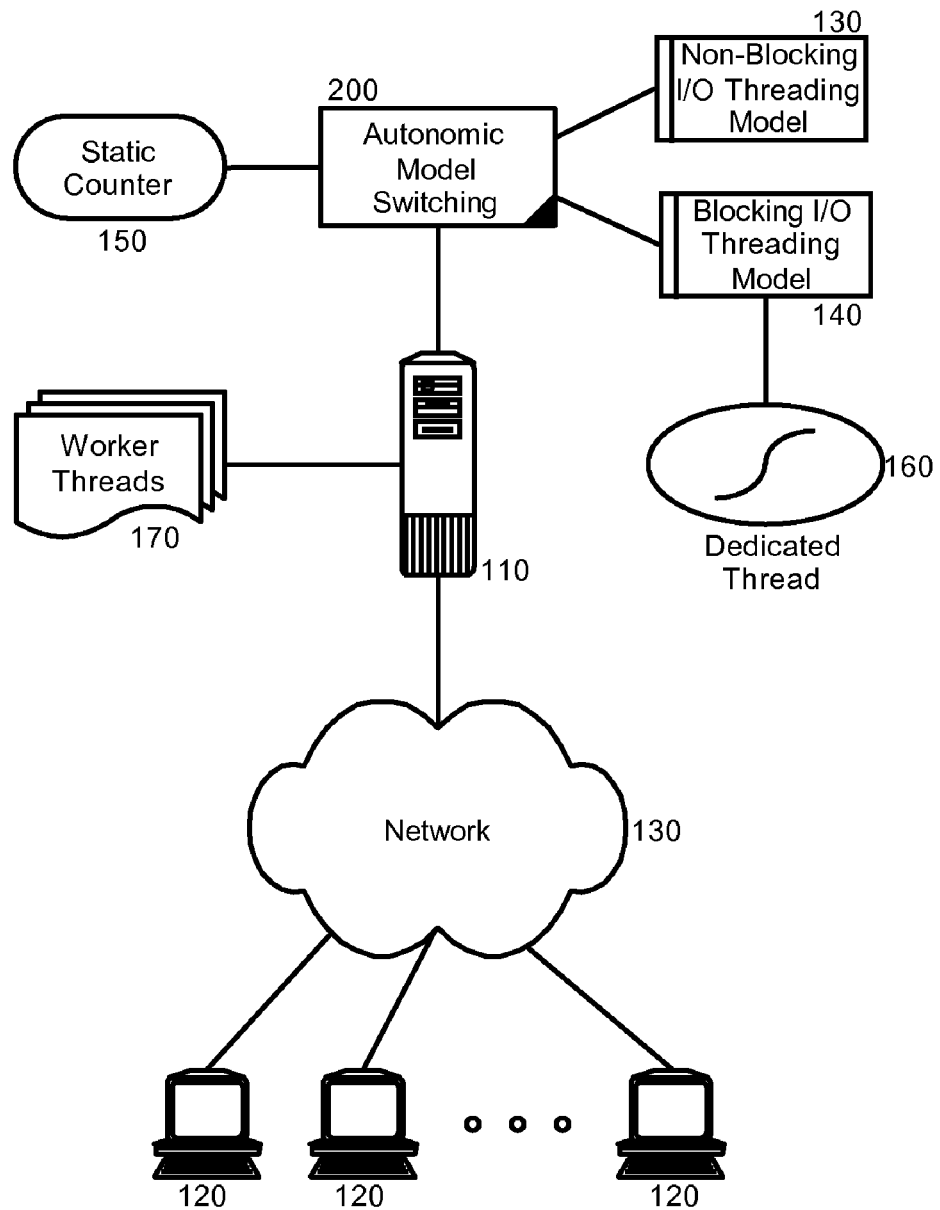
FIG. 1 is a schematic illustration of a data processing system configured for autonomic threading model switching based upon I/O request types; and, FIG. 2 is a flow chart illustrating a process for autonomic threading model switching based upon I/O request types.

In further illustration, FIG. 1 is a schematic illustration of a data processing system configured for autonomic threading model switching based upon I/O request types. The system can include an application server 110 configured for coupling to one or more client computing systems 120 over a computer communications network 130. The application server 110 can include one or more worker threads 170 supporting program logic enabled to process I/O requests in the application server 110 according to either a non-blocking I/O threading model 130, or a blocking I/O threading model 140.

The non-blocking I/O threading model 130 can support asynchronous I/O in which the worker threads 170 directly handle I/O requests and I/O responses in the application server 110. By comparison, the blocking I/O threading model 140 can support synchronous I/O in which a dedicated thread 160 can be established to process I/O requests and I/O responses in the application server 110. In the latter circumstance, the blocking I/O threading model 140 can manage blocking I/O requests while passing non-blocking I/O requests to the worker threads 170.

Notably, the blocking I/O threading model 140 can be selectively activated through the creation of the dedicated thread 160 according to a volume of blocking I/O requests received in the application server 110. In this regard, a static counter 150 can be maintained to track the volume of blocking I/O requests received in the application server 110. The counter 150 can be incremented whenever a blocking I/O request is received and decremented whenever a blocking I/O request is completed. When the counter 150 exceeds a threshold value, the dedicated thread 160 can be created and the blocking I/O threading model 140 can be activated. Likewise, when the counter 150 falls below the threshold value, the dedicated thread 160 can be destroyed and the non-blocking I/O threading model 130 can be activated.

Figure 2:
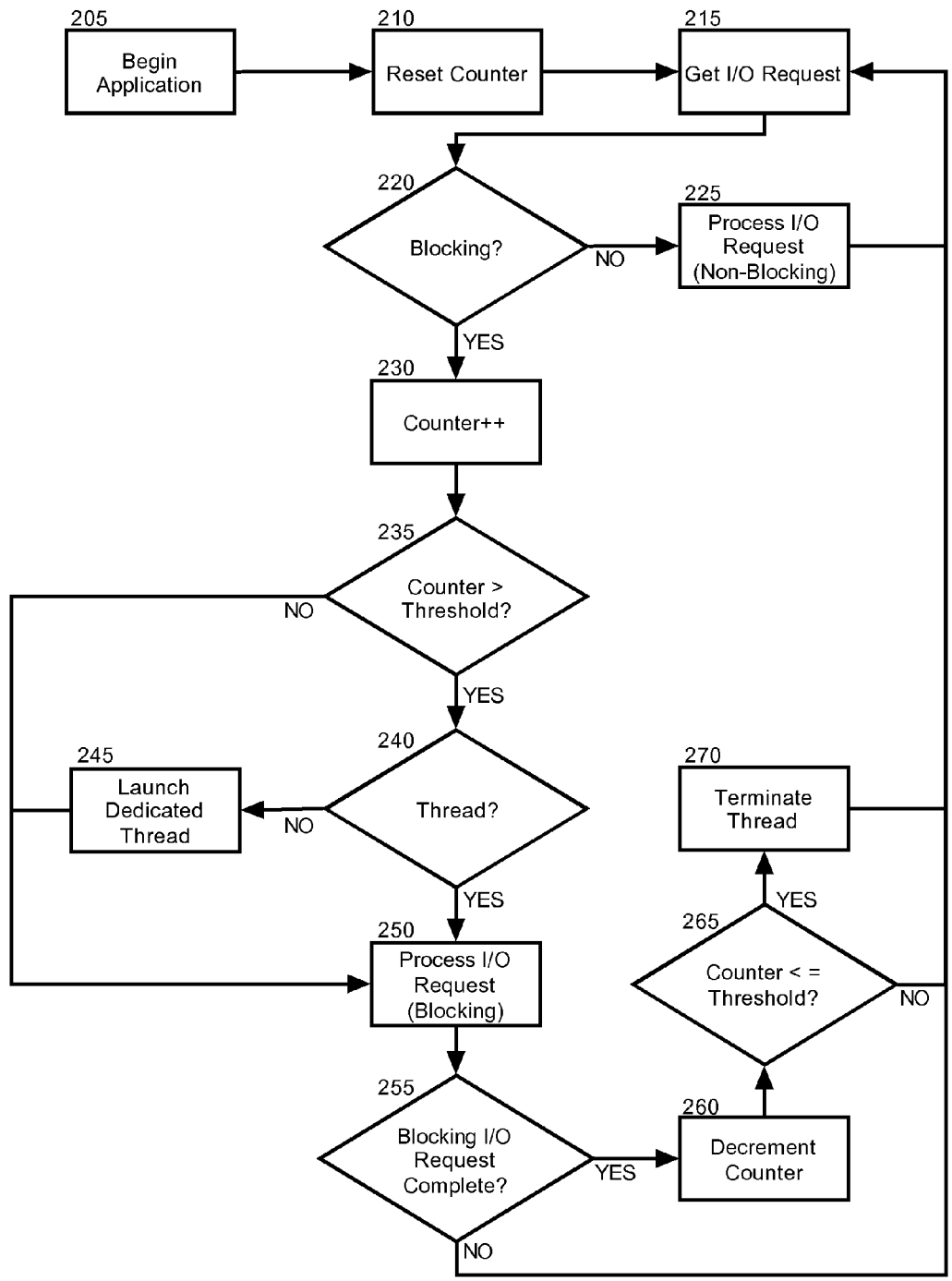

In yet further illustration, FIG. 2 is a flow chart illustrating a process for autonomic threading model switching based upon I/O request types. Beginning in block 205, an application can be launched and in block 210, the counter can be reset. In block 215, an I/O request can be received. In decision block 220, if the received I/O request is a non-blocking I/O request, in block 225, the received I/O request can be processed according to a non-blocking I/O request threading model. Otherwise, the process can continue through block 230.

In block 230, in that a blocking I/O request has been received, the counter can be incremented. In decision block 235, if the counter now exceeds a threshold value, in decision block 240 it further can be determined if a blocking I/O request threading model already has been activated such that a dedicated thread already has been spawned. If not, in block 245, a dedicated thread can be spawned and a blocking I/O request threading model activated. Thereafter, in block 250 the blocking I/O request can be processed according to the blocking I/O request threading model.

In decision block 255, it can be determined whether a blocking I/O request has completed. If so, in block 260 the counter can be decremented. Thereafter, in decision block 265 it can be determined whether the counter now falls below the threshold value. If so, the dedicated thread can be terminated and the blocking I/O request threading model can be de-activated in favor of the non-blocking I/O request threading model. In this way, the resource consumption associated with the blocking I/O request threading model can occur only when a volume of received blocking I/O requests justifies the resource consumption. Otherwise, resources can be conserved in view of a low volume of received blocking I/O requests.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for autonomic threading model switching based upon input/output (I/O) request types, comprising:
   selectably activating and de-activating a blocking I/O threading model according to a volume of received and completed blocking I/O requests by
      establishing a threshold value above which the blocking I/O threading model is to be activated;
      incrementing a counter for each received blocking I/O request; and
      responsive to the counter exceeding the threshold value, activating the blocking I/O threading model.

2. The method of claim 1, wherein
the selectably activating and de-activating comprises:
   decrementing the counter for each completed blocking I/O request; and
   responsive to the counter falling below the threshold value, de-activating the blocking I/O threading model.

3. The method of claim 2, wherein
the activating the blocking I/O threading model comprises
   spawning a dedicated thread to process completed blocking I/O requests, and
   concurrently deferring completed non-blocking I/O requests to associated worker threads.

4. The method of claim 3, wherein
the de-activating the blocking I/O threading model comprises destroying the dedicated thread.

5. The method of claim 1, wherein
the activating the blocking I/O threading model comprises
   spawning a dedicated thread to process completed blocking I/O requests, and
   concurrently deferring completed non-blocking I/O requests to associated worker threads.

6. A data processing system configured for autonomic threading model switching based upon input/output (I/O) request types, the system comprising:
   a blocking I/O request threading model;
   a non-blocking I/O request threading model; and,
   an autonomic model switching processor configured to
   selectably activate and de-activate the blocking I/O request threading model according to a volume of received and completed blocking I/O requests in the system by
      establishing a threshold value above which the blocking I/O threading model is to be activated;
      incrementing a counter for each received blocking I/O request; and
      responsive to the counter exceeding the threshold value, activating the blocking I/O threading model.

7. The system of claim 6, wherein
the counter is configured to be decremented responsive to a completion of a blocking I/O request in the system.

8. The system of claim 6, wherein
the blocking I/O request threading model is configured to spawn a dedicated thread to processing blocking I/O requests.

9. A computer program product comprising a computer usable storage medium having stored therein computer usable program code for autonomic threading model switching based upon input/output (I/O) request types, the computer usable program code, which which when executed by a computer hardware system, causes the computer hardware system to perform:
   selectably activating and de-activating a blocking I/O threading model according to a volume of received and completed blocking I/O requests by
      establishing a threshold value above which the blocking I/O threading model is to be activated;
      incrementing a counter for each received blocking I/O request; and
      responsive to the counter exceeding the threshold value, activating the blocking I/O threading model.

10. The computer program product of claim 9, wherein
the selectably activating and de-activating comprises:
   decrementing the counter for each completed blocking I/O request; and
   responsive to the counter falling below the threshold value, de-activating the blocking I/O threading model.

11. The computer program product of claim 10, wherein
the activating the blocking I/O threading model comprises
   spawning a dedicated thread to process completed blocking I/O requests, and
   concurrently deferring completed non-blocking I/O requests to associated worker threads.

12. The computer program product of claim 11, wherein
the de-activating the blocking I/O threading model comprises computer usable program code for destroying the dedicated thread.

13. The computer program product of claim 9, wherein
the activating the blocking I/O threading model comprises
   spawning a dedicated thread to process completed blocking I/O requests, and
   concurrently deferring completed non-blocking I/O requests to associated worker threads.

* * * * *